(12) United States Patent
Kido

(10) Patent No.: US 12,036,982 B2
(45) Date of Patent: Jul. 16, 2024

(54) VEHICLE TRAVELLING CONTROL APPARATUS, VEHICLE TRAVELLING CONTROL METHOD AND COMPUTER PROGRAM PRODUCT

(71) Applicant: Hitachi Astemo, Ltd., Hitachinaka (JP)

(72) Inventor: Hideaki Kido, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 302 days.

(21) Appl. No.: 17/613,240

(22) PCT Filed: May 29, 2020

(86) PCT No.: PCT/JP2020/021405
§ 371 (c)(1),
(2) Date: Nov. 22, 2021

(87) PCT Pub. No.: WO2020/246391
PCT Pub. Date: Dec. 10, 2020

(65) Prior Publication Data
US 2022/0212661 A1 Jul. 7, 2022

(30) Foreign Application Priority Data
Jun. 4, 2019 (EP) .................................... 19305722

(51) Int. Cl.
*B60W 30/095* (2012.01)
*B60W 30/02* (2012.01)
(Continued)

(52) U.S. Cl.
CPC ...... *B60W 30/0956* (2013.01); *B60W 30/025* (2013.01); *B60W 40/09* (2013.01);
(Continued)

(58) Field of Classification Search
CPC ........... B60W 30/0956; B60W 30/025; B60W 40/09; B60W 2554/4041;
(Continued)

(56) References Cited

U.S. PATENT DOCUMENTS 9,381,916 B1 * 7/2016 Zhu .................. B60W 30/0956
2008/0162027 A1 7/2008 Murphy et al.
(Continued)

FOREIGN PATENT DOCUMENTS

| EP | 3001272 A1 | 3/2016 |
| WO | WO-2017/098486 A1 | 6/2017 |
| WO | WO-2017/158983 A1 | 9/2017 |

OTHER PUBLICATIONS

International Search Report and Written Opinion issued in corresponding application No. PCT/JP2020/021405 dated Aug. 25, 2020.

*Primary Examiner* — Tyler D Paige
(74) *Attorney, Agent, or Firm* — Foley & Lardner LLP

(57) ABSTRACT

The present subject matter especially relates to a travelling control apparatus, a corresponding travelling control method, an own vehicle including the travelling control apparatus, and a computer program product which is adapted to carry out the travelling control method. There is optimized the use of computational resources and the driving comfort is increased.

13 Claims, 6 Drawing Sheets

(51) Int. Cl.
  *B60W 40/09* (2012.01)
  *G06V 20/58* (2022.01)
  *G08G 1/16* (2006.01)

(52) U.S. Cl.
  CPC ..... *G06V 20/58* (2022.01); *B60W 2554/4041* (2020.02); *B60W 2554/4049* (2020.02)

(58) Field of Classification Search
  CPC ........... B60W 2554/4049; G06V 20/58; G06V 20/56; G08G 1/167; G08G 1/166
  USPC ......................................................... 701/301
  See application file for complete search history.

(56) References Cited

U.S. PATENT DOCUMENTS

| | | | | |
|---|---|---|---|---|
| 2016/0328975 | A1* | 11/2016 | Tokita | G06V 20/584 |
| 2017/0016734 | A1* | 1/2017 | Gupta | B60W 30/00 |
| 2017/0131719 | A1* | 5/2017 | Micks | B60W 60/0015 |
| 2017/0206787 | A1* | 7/2017 | Ando | B60W 30/08 |
| 2019/0019045 | A1* | 1/2019 | Ogura | G06V 10/44 |
| 2019/0118808 | A1 | 4/2019 | Kawasaki et al. | |

* cited by examiner

VEHICLE TRAVELLING CONTROL APPARATUS, VEHICLE TRAVELLING CONTROL METHOD AND COMPUTER PROGRAM PRODUCT

TECHNICAL FIELD

The present subject-matter especially relates to a travelling control apparatus, a corresponding travelling control method, an own vehicle including the travelling control apparatus, and a computer program product which is adapted to carry out the travelling control method. It is a technical benefit that the control allows avoiding a collision with another vehicle at optimized computational costs and with increased driving comfort. Examples for application scenarios include routes where lanes/streets cross/intersect, such as roundabouts, highway approaches roads, and the like.

BACKGROUND ART

EP3387385A1 describes assisting a motor vehicle driver in negotiating a roundabout. The advanced driver assistance system described is designed to receive and process motor-vehicle position-related data and motor-vehicle motion-related data of an own motor vehicle and of neighbour motor vehicles detected in the vicinity of the own motor vehicle and which have been determined as entering the same roundabout in which the host motor vehicle will enter, to provide assistance to the driver of the host motor vehicle for negotiating the roundabout. A degree of proximity of the own motor vehicle and the neighbour motor vehicle to the roundabout based on motor-vehicle position-related data is determined and a determined alert level is provided the driver.

EP3001272A1 describes a method of trajectory/travelling planning for yielding manoeuvres. The method comprises the steps of: determining a longitudinal safety corridor for the own vehicle that allow the own vehicle to longitudinally position itself in between two or more surrounding objects; determining a longitudinal trajectory for the own vehicle respecting the bounds given by the longitudinal safety corridor; determining a lateral safety corridor for the own vehicle using the longitudinal trajectory to determine upper and lower bounds on the own vehicle's lateral position; determining a lateral trajectory for the own vehicle respecting the bounds given by the lateral safety corridor.

CITATION LIST

Patent Literature

PTL 1: EP 3387385A1
PTL 2: EP 3001272A1

SUMMARY OF INVENTION

Technical Problem

However, the prior art does not show a driver assistance system or an autonomous driving system which is able to take into account that a detected object/neighbouring vehicle may change the driving route before the own vehicle and the detected object/neighbouring vehicle may collide. If possible changing manoeuvres of the detected object/neighbouring vehicle would be taken into account, the driver of the own vehicle or the autonomous driving system of the own vehicle could adapt the behavior accordingly which would improve, inter alia, driving comfort of the driver of the own vehicle. Further, even if detection and detailed analysis of the behaviour (manoeuvres) of the detected object would be performed, high computational resources would be required in the prior art.

The herein described and claimed subject-matter addresses the technical problem to provide at least a travelling control apparatus for an own vehicle which realizes automated or assisted driving of the own vehicle and which enables to avoid collisions with another vehicle especially at areas where lanes/streets merge, for example roundabouts and highway approaches roads, at optimized computational costs and with increased driving comfort. This technical problem is solved by the appended claims.

Solution to Problem

According to the subject-matter set forth in the appended claims, there is proposed a vehicle travelling control apparatus {or an automated driving apparatus or (advanced) driving assistance apparatus}, a travelling control method, a vehicle using an automated driving control apparatus and/or a computer program product.

In particular there is provided a vehicle travelling control apparatus configured to be installed at an own vehicle. The apparatus includes a localization unit configured to determine the actual position of the own vehicle. The actual position may be provided via GPS (or comparable) geometrical/geographical coordinates, it may be provided by means of relative parameters, such as its position on a specific street, its distance to a fixed, known point of interest or the like. The apparatus further may have an area prediction unit which may comprise a meeting area prediction unit and a branching area prediction unit. The area prediction unit may be configured to receive map information from a map information unit. The map information unit may be located outside of the apparatus, e.g. on a remote server which is connected via a (wireless) data connection to the apparatus, or it may be provided within the apparatus or at least within the own vehicle, e.g. by means of a navigation apparatus, a storage device including map data, etc. The map information preferably includes information about street(s) ahead of the actual position of the own vehicle.

The apparatus may further include an object detection unit which is configured to receive information from a vehicle surroundings observation unit of the own vehicle and to detect an object in the surroundings of the own vehicle based on said received data. The vehicle surroundings observation unit may include one of or a combination of a radio detection and ranging (RADAR) sensor, a light detection and ranging (LIDAR) sensor, a light amplification by stimulated emission of radiation (LASER) sensor, a sound navigation and ranging (SONAR) sensor (e.g. ultrasound), an infrared (IR) sensor, an image sensor (e.g. camera), vehicle location devices (e.g. GPS), etc. Detection of an object may be performed, i.a., by detecting predefined sensor patterns in the data or another known method.

If an object is detected, wherein the object may include another vehicle, other traffic participants, such as bikes, pedestrians, trucks, etc., a position matching unit of the apparatus may be configured to determine whether said object detected and the own vehicle may possibly meet within a meeting area at an intersection ahead of the own vehicle. The meaning of "meet" shall include the detected object and the own vehicle may come close to each other, preferably, at the same time or within a predefined time window, or that they may even collide within the "meeting area" when both will continue to follow their actual driving/travelling path. The meeting area is the area where the "meeting" could happen, e.g. in a roundabout, at a merging of lanes, such as an approach lane of a highway, and the like.

A possible meeting or a possibility for a meeting may be determined based on information provided by, e.g. the object detection unit which may not only detect an object but additionally it may be configured to predict possible future travelling paths/options of the detected object and it may check whether a meeting may take place based on said information. For example, the object detection unit may additionally detect/determine/estimate a speed of the object, e.g. by detecting the position at successive time points/frames or by information wirelessly transmitted/exchanged between the object and the own vehicle or the like, and it may further use the map information to determine the possible future travelling options/paths of the detected object. In regard of the latter point, e.g., the future travelling paths may be determined, with low computational effort, based on the different lanes/streets the detected object may use in the future starting from the detected actual position, which may be, e.g. in a round-about, following the circle lane or taking one of possibly a plurality of exits. The information about the speed and the future travelling options may be used to check whether the own vehicle, following the actual travelling plan, may meet in the meeting area at approximately the same time or within a predetermined time window which may have a length of a one or a plurality of seconds. Even further, alternatively, if may suffice for determining that a meeting may happen if the detected object may be at the same position, preferably within the meeting area, at any time to determine that a meeting may take place. This latter alternative would generally assume, i.e. irrespective of the timing, that a meeting may take place if the detected object and the own vehicle cross travelling paths during their future travelling. The future travelling options/path of the detect object may also be determined/estimated by other units of the control apparatus than the object detection unit or it may be determined in a remote computer/server. To put it in even different words, in an example using lowest computational resources, an object is detected and its position is determined. Than it is checked which lanes/streets it may take starting from the actual position and based on information about the lanes/streets stemming from map information. Then it may be checked whether one of these options for the future travelling of the detected object may be identical with a position of the future travelling plan of the own vehicle. For example, the latter part may be determined by checking for possibly commonly used intersections, lane merging areas and the like ahead of the own vehicle and the detected object. Preferred use cases, for example, relate to a round-about and highway approach lanes.

The object behavior prediction unit may further be provided within the apparatus. It may be configured to predict a future behavior/maneuver of the detected object. The object behavior prediction unit may be deactivated as long as the position matching unit does not estimate that a collision/meeting with the own vehicle could happen in a meeting area. Said prediction may use, as a basis, the possible future travelling paths of the detected object, which may have been determined by a unit of the apparatus. More specifically, it may be a preferred option that the object behavior prediction unit may be configured to analyze the detected object after its detection in order to find out which of the possible travelling paths/options it may take in the future. Even more specific, as one example, in a roundabout the detected object may be driving within the roundabout and the own vehicle may approach the roundabout. The own vehicle and the detected object thus may meet at the entry point of the own vehicle. The detected object may however chose a possible travelling path which exits the roundabout before the position where the own vehicle would enter or it may continue travelling within the roundabout. In the first case, the travelling paths of the detected object and the own vehicle would finally not meet and the apparatus may control the own vehicle to enter the roundabout without stopping. In the latter case, the own vehicle would have to stop because the detected object in the roundabout continues to drive the roundabout. In other words, the driving behavior of the driving assistance apparatus (or automated driving apparatus) would reproduce a driving style which is comparable to a human driver and the comfort of the driver in the own vehicle is increased.

As explained above, depending on the predicted future behavior of the detected object, the own vehicle may have/want to adapt its travelling path or plan, e.g. it may stop in front of the entry to the roundabout or it may smoothly continue to enter it. Hence, the apparatus may have a vehicle control unit which may decide about adapting a travelling path/plan of the own vehicle based on the predicted future travelling plan of the detected object.

Further, the meeting area prediction unit is configured to set or define a meeting area and the branching area prediction unit is configure to set or define a branching area ahead of the meeting area (ahead means: ahead in the travelling direction of the detected object) and in which the detected object can change its travelling path before entering the merging area. As explained above, the branching area may be an area which is positioned (e.g. timewise or with regard to a position) before the meeting area from the viewpoint of the detected object and in the branching area the detected object may chose a different travelling path/option. In a roundabout, e.g., the branching area may be an area of the street at which the detected object could exit the roundabout or continue driving in the roundabout following the circle lane.

Further, the object behavior prediction unit may be configured to apply a normal prediction mode if the detected object is outside said branching area and a detailed prediction mode if the detected object is within said branching area. The use of two different prediction modes especially allows optimizing computing resources for achieving a reduced computational effort. In the branch(ing) area the detailed analysis of the detected object may lead to very precise information in regard of the future behavior thereof. E.g., the activation of a blinker may be detected, a deceleration could be recognized or the like which can be used for estimating the future behavior and especially for predicting the travelling path it will take. Outside the branching area, the level of detail is reduced to save computational costs and, e.g., "merely" the travelling speed and direction or the like are determined/estimated/predicted.

As noted above the claimed subject-matter allows that the automatic driving/assisted driving apparatus may "behave" like a human driver so that the driver of the own vehicle has not discomfort and the computational burden is reduced at the same time.

Further, in the normal prediction mode, the object behavior prediction unit may use a predetermined number of features of the detected object for predicting the future behavior of the detected object and in particular mathematical calculations can be applied for determining the detected object's actual driving behavior/travelling plan. For example, as soon as the object is detected, the actual travelling path may be calculated based on input from the own vehicle sensors, map information about the street/lane it travels and known mathematical models for calculating travelling paths. For example, it could be calculated the vehicles driving direction, its speed and it could be considered the lane/street it travels. Based on the street information of streets/lanes ahead of the detected object, different possible travelling paths may be determined. In a simplest yet effective option for predicting the possible travelling paths, the actual position of the detected object may be determined and, subsequently, each possible lane or road it may take starting from this position could be considered as one possible travelling path.

Further, preferably in the detailed prediction mode, more features of the detected object than in the normal prediction mode are used for predicting the future behavior/future travelling path of the detected object. Additional features may include the blinker, tire position, movements of the chassis/bodywork of the detected object, data send from the detected object via a wireless communication link with the own vehicle and the like.

The computational effort of the detailed analysis is only used during a narrowly defined area so that the computational resources of the apparatus are used in an optimized fashion.

Further, the prediction of the future behavior may include predicting which of a plurality of possible future travelling paths/options the detected object may take. Alternative or in addition, the prediction may also include the driving style, in particular, the speed of the detected object. If the detected object stops or reduced/increases its speed, a meeting in the meeting area may not happen.

Further, in the normal prediction mode, the future behavior of the detected object may predicted based on at least one the features including speed of the detected object, direction of movement of the detected object, shape of the detected object, map information including the lane or street it travels, and the like.

Further, in the detailed prediction mode, the future behavior of the detected object may be predicted based on at least one of the additional features including a state of the blinker, a tire position, movements of the chassis/bodywork of the detected object, data send from the detected object via a wireless communication link with the own vehicle and the like. A change of the tire shape between two time frames, which means between two points in time or simply the change from a first time of observing the tire shape to a second time may also be used as another feature which may indicate that the vehicle is about to change the driving direction or the like.

Further, the map information is received from a map information unit and the map information received include at least links representing lanes and/or streets and nodes representing intersections of lanes and/or streets. If maps are broken down to lanes and nodes, basically, the computational effort of defining the meeting area and the branching area is further reduced. For example, with regard to the setting of meeting and branching area(s), the meeting area is preferably set at a node which is located in an area where the detected object and the own vehicle may meet in the future and the branching area is set at a node before the node of the meeting area in the driving direction of the detected object. Wherein the branching area may be preferably set at a node immediately before the node of the meeting area in the driving direction of the detected object.

Further, a diameter of the meeting and/or branching area may be set based on parameters of the street, e.g. the single, double, triple or the like width of the street or of the lane may be used as a diameter/cross sectional parameter of the area. The size of the branching and/or meeting area may also be based on a predefined (fixed value) or it may be taken from a database which may define area sizes for different driving situations/places. Depending on the size of the areas, computational costs and smooth driving behavior of the own vehicle can be varied and optimized.

Further, the apparatus may have a planning unit that is configured to generate a future travelling plan of the own vehicle or the planning unit may receive the travelling plan(s) of the own vehicle from a computer outside the own vehicle which submits the travelling plan data to the vehicle by way of wireless communication. In any case, the own vehicle thus may be able to adapt a future travelling plan flexibly depending on, e.g., the behavior of other vehicle or traffic participants.

As mentioned in examples before, an intersection of streets or lanes preferably includes roundabouts and approach lanes of a motorway in which computational costs can be saved most effectively by the herein described method as well as comfort for the driver can be increased.

An own vehicle as claimed may include a vehicle travelling control apparatus according to at least one of the features described before and a vehicle surroundings observation unit, which may be at least one of or a combination of a lidar unit, a camera unit, a stereo-camera unit, a radar unit, an electromagnetic wave unit, etc.

A method for (automated/semi-automatic) control of an own vehicle may comprise the steps of: receiving map information and localizing an actual position of the own vehicle; detecting an object in the surroundings of the own vehicle based on received data from a vehicle surroundings observation unit of the own vehicle; determining whether a detected object and the own vehicle could meet in a meeting area at an intersection towards which the own vehicle travels; predicting a future behavior of the detected object if it was estimated that a meeting could happen in said meeting area; and/or deciding about an adaption of a travelling plan of the own vehicle based on the predicted future behavior of the detected object, wherein a normal prediction mode is applied if the detected object is outside a branching area and a detailed prediction mode is applied for the predicting of the future behavior of the detected object if the detected object is within a branching area, which is defined to be an area that is placed before the meeting area in the travelling direction of the detected object and in which the detected object can change its travelling path before entering the meeting area.

A computer program product storable in a memory may comprise instructions which, when carried out by a computer, cause the computer to perform the before described method.

Advantageous Effects of Invention

Summarizing, the invention provides a solution to increasing the reliability of a travelling control apparatus of a vehicle, such as a car, a truck, a motor bike and the like. The travelling safety and comfort can be improved as well.

BRIEF DESCRIPTION OF DRAWINGS

In the following the claimed subject-matter will be further explained based on at least one preferential example with reference to the attached exemplary drawings, wherein:

DESCRIPTION OF EMBODIMENTS

Figure 1:
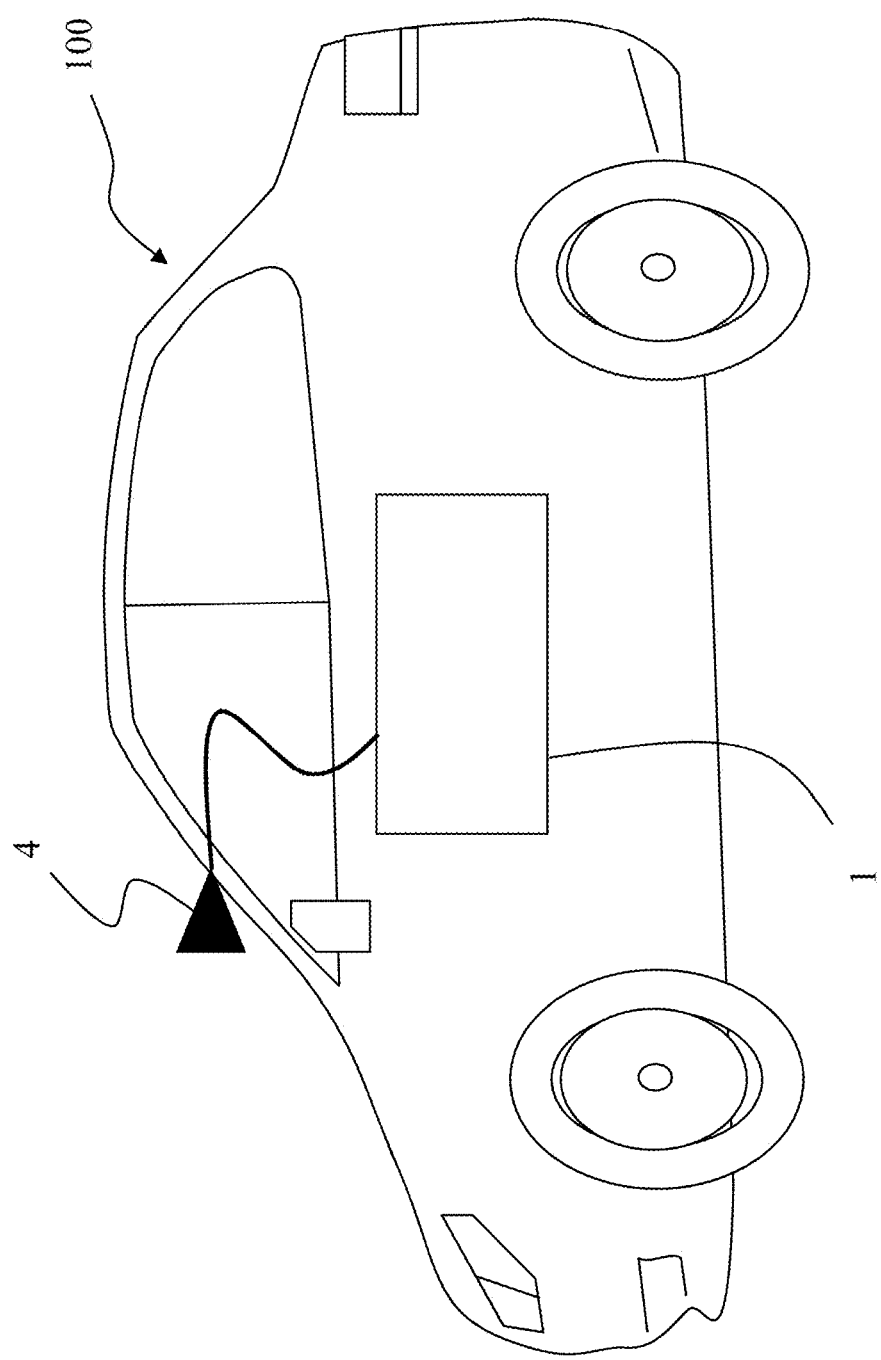
FIG. 1 shows a schematic of an own vehicle 100.

FIG. 1 shows an exemplary vehicle which may include, inter alia, a vehicle travelling control apparatus 1 according to the claimed subject matter and at least one vehicle surroundings observation unit 4 which are connected to each other and installed within the own vehicle 100. A control unit of the own vehicle 100 and the vehicle travelling control apparatus 1 may be provided and they may be separate units; alternatively the two units may be combined to form a single unit. The own vehicle 100 may have a plurality of control units which may include an engine control unit (ECU).

The own vehicle 100 includes at least one vehicle surroundings observation unit 4 (or simply sensor(s)) and preferably it includes a plurality of such units 4. The vehicle surroundings observation unit(s) 4 may, e.g., include a camera, a stereo camera, a laser radar, a millimeter wave radar, and/or a lidar. The vehicle travelling control apparatus 1 may include further subunits for providing driving control functions, such as steering control units, throttle control units, brake control units and the like. Preferably, the vehicle travelling control apparatus 1 combines all relevant control functions of the own vehicle 100. Based on the above sketched configuration, it is possible that the own vehicle 100 drives autonomously controlled by the control apparatuses/units, which use information provided by the vehicle surroundings observation unit(s) 4 and further information, e.g. information/data received via optional communication units of the own vehicle 100 which can receive data from a remote data source, such as the Internet, remote servers, and/or GPS. The further information may include map information, traffic information, and the like.

Figure 2:
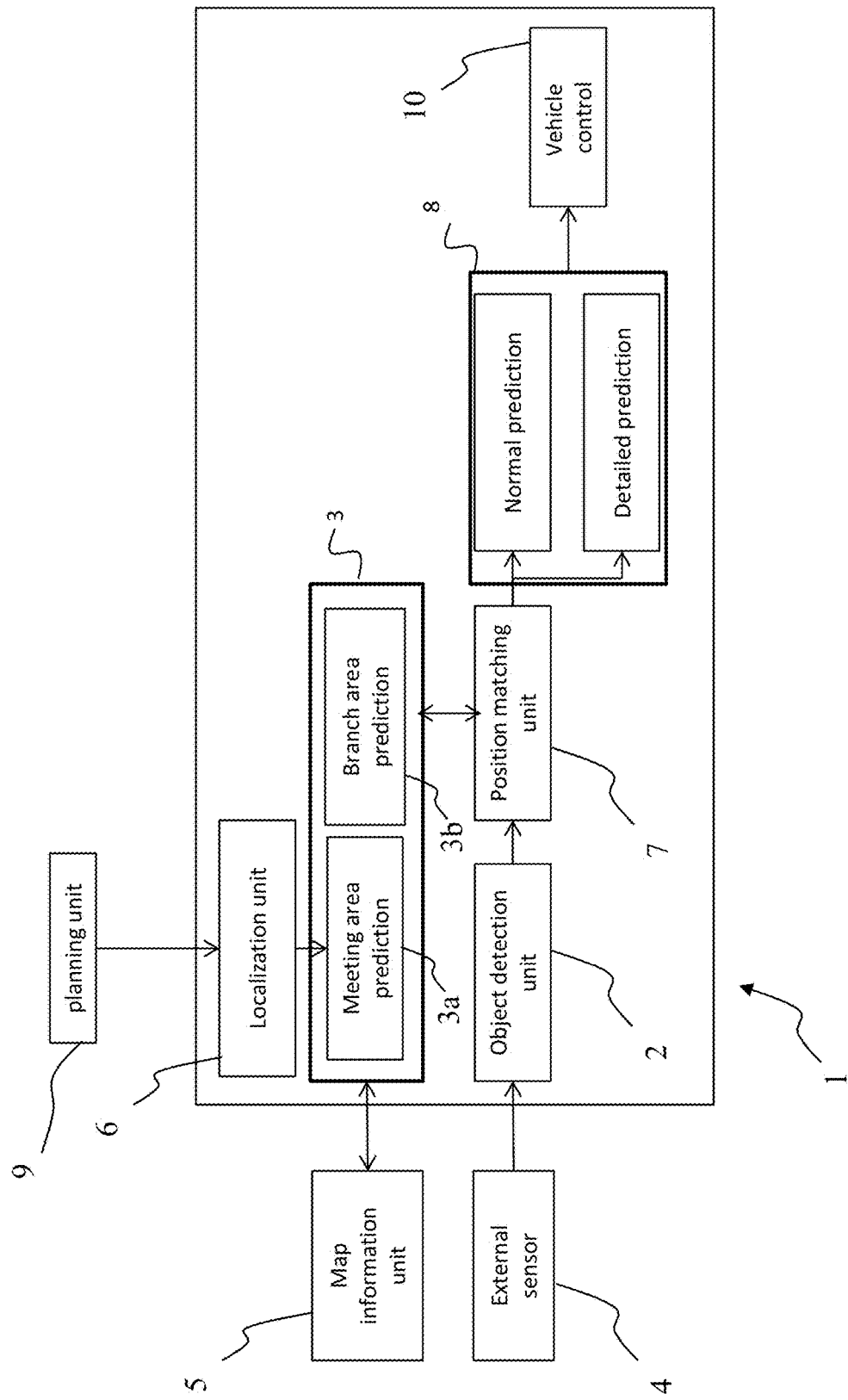
FIG. 2 shows a schematic of a travelling control apparatus 1.

FIG. 2 shows a configuration of the vehicle travelling control apparatus (apparatus) 1. The (external) sensors 4 mounted at the own vehicle 100 gather environmental information around the own vehicle 100 and the information is sent to the vehicle travelling control apparatus 1. The vehicle travelling control apparatus 1 analyses the information from the sensor(s) 4 and determines as to whether obstacles are within the field of view of the sensor(s) 4. Obstacles or objects may include an on-coming other vehicles, and/or pedestrians. The detection of an object is carried out by an object detection unit 2.

Further, an area prediction unit 3 in the apparatus 1, which has a meeting area prediction unit 3a and a branch(ing) area prediction unit 3b, estimates a meeting area and a branching area. The meeting area prediction unit 3a predicts the area where the own vehicle 100 could be affected by the other obstacle/detected objected, wherein "affected" may include a collision. Said area is named "meeting area". The branching area prediction unit 3b predicts an area where the detected obstacle/object can change its driving/travelling path before it enters the meeting area. Hereinafter, this area is called "branching area". The two before described areas are calculated, determined, placed, and/or estimated by using map information provided by a map information unit 5, which may be an on-board navigation map system, or a remote navigation system or the like. A localization unit 6 which estimates the own vehicle's position based on the map information is also provided in the apparatus 1.

Further, the apparatus 1 has a position matching unit 7 which checks if the detected object could arrive at branching and/or meeting area in the near future which may include a time span of up to a couple of seconds or minutes, preferably some seconds up to a minute. This is performed by using the information provided by the object detection unit 2 and the area prediction unit 3. Then it is checked whether the detected object is already within one of these areas. If the apparatus 1 finds that a detected object is within the branching area, it analyses the object's movement in detail, if the detected object is not in the branch area, it analysis the object's movement by applying a "normal" mode. In this way, the apparatus 1 can analyse the object's movement optimized in terms of computational burden.

Figure 3B:
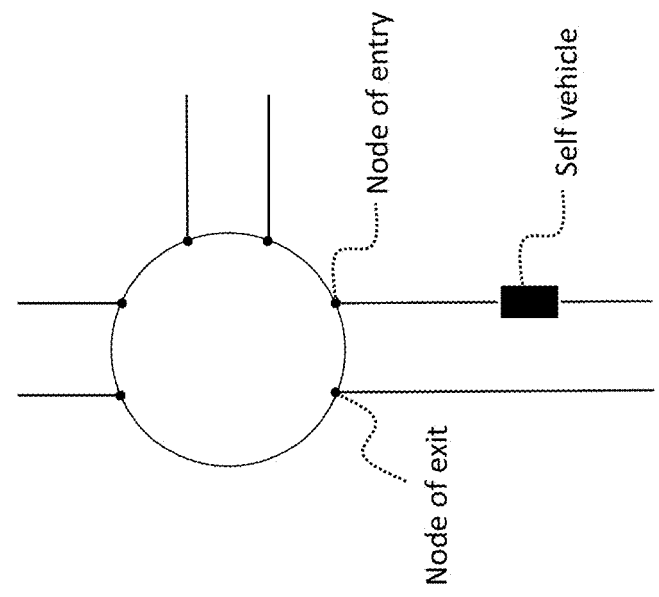
FIGS. 3a-b show an example of an application scenario of the travelling control apparatus 1.
Figure 3A:
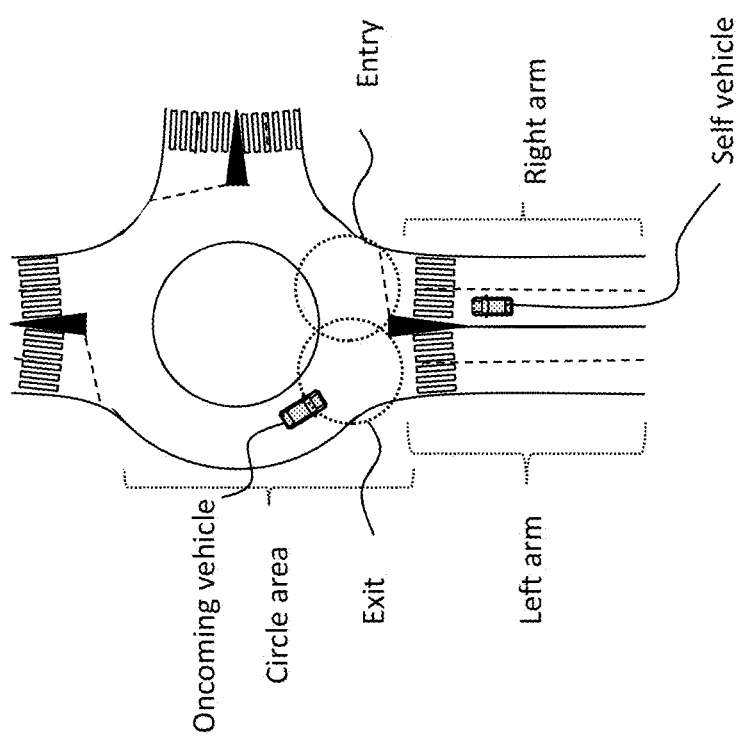

FIG. 3a shows one of the use cases of the apparatus 1. The FIG. 3a shows a case when the own/self/ego vehicle 100 is approaching a roundabout. The approach happens along a "right arm" of the roundabout and there is an on-coming vehicle which is driving in the circle area of the roundabout. The on-coming vehicle is approaching an exit of the roundabout. At this very moment, the apparatus 1 has detected the oncoming vehicle however it cannot decide whether the on-coming vehicle will go along the circle area of the roundabout (i.e. that it will continue to drive within the roundabout) or whether it will exit to the left arm which is located before the entry if the right arm on which the own vehicle 100 travels. In other words, at least two possible travelling plans can be determined by the apparatus 1. Since the future behaviour of the on-coming vehicle (here, which future travelling path of the two different possibilities the on-coming vehicle will take) will affect the/option travelling plan of the own vehicle 100, it is a part of the presently claimed concept to determine/predict the future behaviour of the on-coming vehicle. For example, if the on-coming vehicle would go along the circle area, the own vehicle 100 would have to stop before the entry to avoid a crash and under the assumption that the on-coming vehicle in the roundabout has the right of way. If the on-coming vehicle would exit the roundabout by taking the left arm shown in the Figure, the own vehicle 100 could enter the circle area (smoothly) without stopping and the driver would have no feeling of discomfort.

In the above situation, the area prediction unit 3 of the apparatus 1 analyses the map information shown in FIG. 3b (right side). The map information preferably include road structure information with node(s) and link(s), wherein node(s) indicate an intersection and link(s) indicate a road itself respectively. FIG. 3b shows that there is a node of entry into the roundabout and node of exit guiding out of the roundabout. The Figure further indicates one lane per road. Further, information stemming from the localization unit 6 provide the position of own vehicle 100. The position may indicate the position of the own vehicle 100 "within" the map information, i.e. the own vehicle's position at a certain position in relation to a link or node. Based on the map information, the apparatus 1 can determine that the next intersection is a node of entry into a roundabout, that there is a node of exit located before the node of entry in the driving direction of a vehicle travelling within the roundabout (if the roundabout is travelled in the counter-clock direction), and that both nodes are placed close to each other. More specifically, the node of entry and the node of exit which are shown in FIG. 3b are located directly next to each other. The two nodes correspond to the entry and exit on the "real" map as depicted in FIG. 3a on the left side.

Further, the meeting area prediction unit 3a sets a meeting area at the nearest intersection of the road/lane (nearest to the own vehicle 100) that the detected object can cross/drive to as well. In the case of FIG. 3, the meeting area prediction unit 3a defines the entry of the roundabout as the meeting area. FIG. 4a shows the result of setting the meeting area. In this example, the meeting area has a circular shape and the diameter is approximately corresponding to the width of the street of the roundabout.

Further, the branching area prediction unit 3b in the apparatus 1 sets a branching area at an intersection (preferably the closest one) before the meeting area and at a point/area where the detected object can change its travelling path. In the case of FIG. 3, the branching area prediction unit defines the exit as branching area because, in the exit area, the detected object (on-coming vehicle) can change its path by going along the circle area or exiting the circle area to the left arm. FIG. 4a shows the result of setting the branching area and the arrows in this Figure show the different travelling path possibilities/possible travelling plans of the on-coming vehicle, path 1 and path 2. Furthermore, FIG. 4b shows, on the right side of FIG. 4, the detected object and the set meeting and branching area from the viewpoint of a driver or a camera of the own vehicle 100.

The branching area, as shown by FIG. 4a, may be circular or elliptic or of any other shape, such as rectangular or the like. The smaller the branching area is set, the less computational resources are consumed/required because the detailed analysis takes place during shorter time intervals. The apparatus 1 may include a storage or may receive from a planning unit 9 the information about the size and shape of the area to be used. Values for size and shape may be stored in a map correlation predefined values to different driving scenarios, such as size and shape for roundabouts with one lane, two lanes, etc. The size and shape of the meeting and the branching area may in addition or alternatively be calculated by the apparatus 1 according to the specific driving scenario: For example, the map information unit 5 may deliver information about the width, shape or the like of the road ahead and the apparatus 1 may calculate the size/chose the shape to cover a maximum area of the part of the road at which lanes/roads merge/cross/etc.

Subsequently in the principal control flow, which may be performed in a looped manner or some steps thereof may be performed in a loop, the branching area is used for deciding about different analysis modes for analysing the behaviour of the detected object.

Figure 4B:
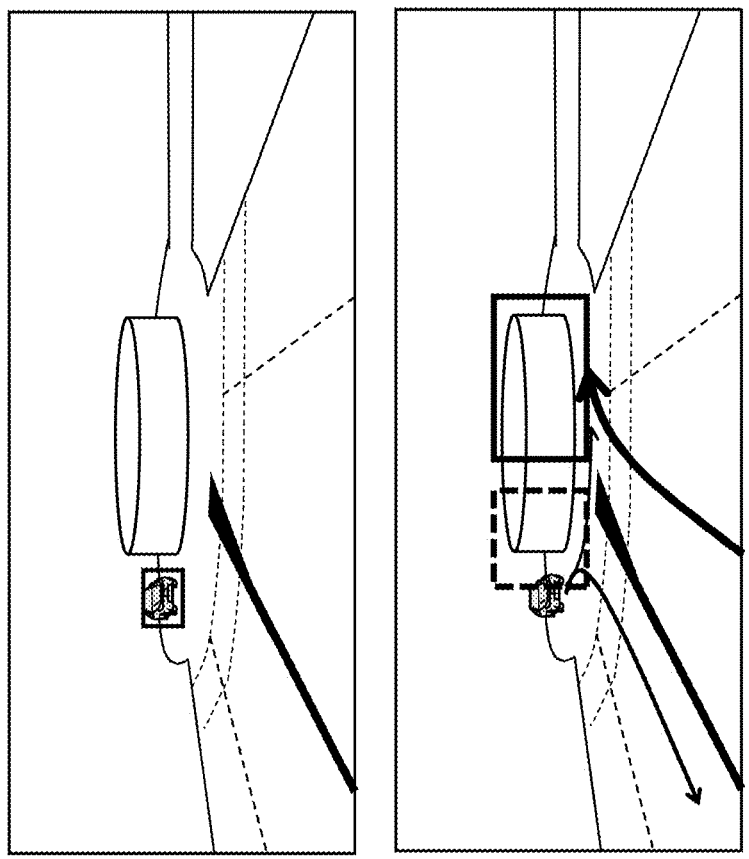
FIGS. 4a-b show further schematics for the example according to FIG. 3, FIGS. 5a-c show examples for identifying another vehicle.
Figure 4A:
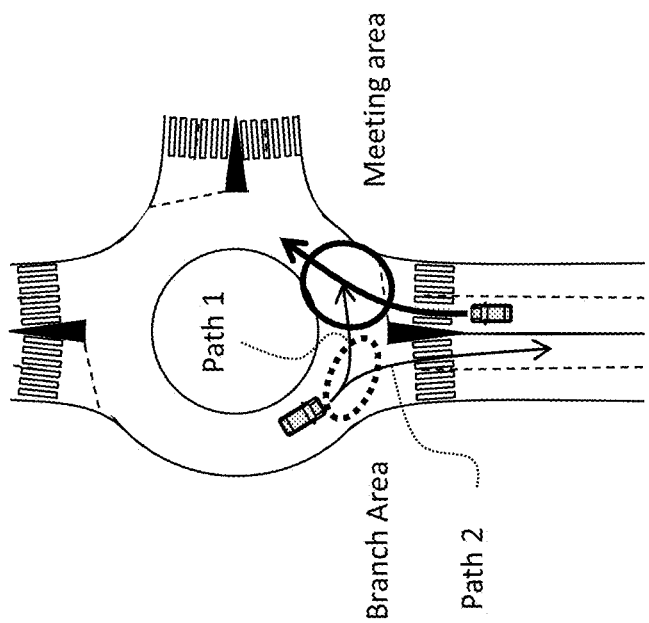

FIG. 4b on the upper side shows an example taken by a front camera mounted on the own vehicle 100 which shows the situation in which an object (here it is an on-coming vehicle) is detected as well as a roundabout ahead. The detection of the on-coming vehicle, in this example, is based on the pictures/data of the front camera of the own vehicle 100 detecting a shape of another vehicle in the picture. Then, FIG. 4b on the lower part shows examples of the meeting area and the branching area as well as the possible travelling paths of the on-combing vehicle and the (planned) travelling path of the own vehicle 100. Although said areas are represented by a rectangle in the Figure, they can be projected as cuboids or another volumetric representation as well. In one example, based on the projection of the areas, the position matching unit in the apparatus 1 can determine whether the on-coming vehicle is in the branching area or not. Other possibilities include the possibility that the position of the areas (e.g. based on GPS coordinates or the like) are stored to a memory of the apparatus 1 and that these positions are compared continuously/repeatedly to the actual position of the detected object.

Depending on the judgment of the position matching unit 3, the apparatus 1 can choose between different modes for analysing the behaviour of the detected vehicle (on-coming vehicle).

If the detected object is outside the branching area, a behaviour prediction unit 8 analyses the behaviour of detected object in a normal mode. For example, only the shape of the detected object is detected and the possible travelling paths are determined. If the detected object is in the branching area, the behaviour prediction unit 8 analyses the behaviour in a detailed mode. For example, it detects not only the travelling path of an on-coming car, but also features indicating a possible selection of a specific travelling path, including the movement of the tires or a blinker condition. This can support increasing the accuracy of prediction of the behaviour, i.e. which travelling path the detected object may probably choose, here e.g. path1 or path2. Hence it can be avoided that a detailed prediction is constantly used which would demand high computational resources of the apparatus 1. In other words, the present apparatus 1 helps to save computational cost by the above described optimized use of it and increases a predictive reliability with regard of the future behaviour of the detected object.

Figure 5C:
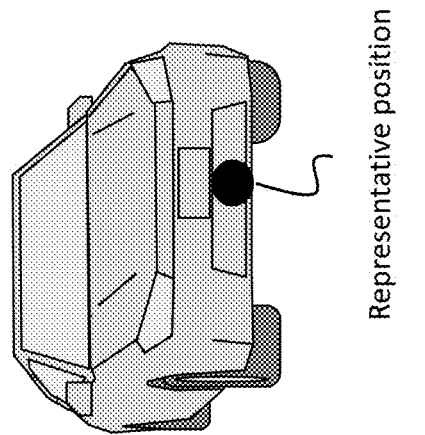
Figure 5B:
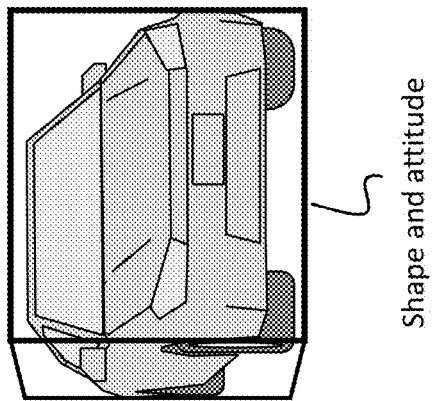
Figure 5A:
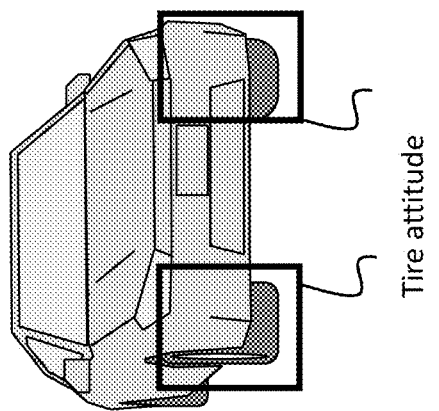

FIGS. 5a and b show possible representations of the analysed objects depending on the prediction mode. Depending on the computational resources of the apparatus 1, a representation such as shown by FIG. 5b can be used for a normal analysis which includes the shape of the detected object (here it would be a car) and its "attitude", such as the travelling path, driving direction, speed and/or the like. FIG. 5a may include the additional details in a detailed analysis which checks for the tire position as well. The tire position may indicate that the car will turn, which will then allow to predict the travelling path it will likely take. If computational resources are very limited, FIG. 5c may be a representation for a normal analysis mode in which the detected object is represented by a (moving) "spot" only.

After the prediction, the prediction result is informed to vehicle control 10, and vehicle control 10 defines a behaviour of the own vehicle 100. The definition of the behaviour may include that the own vehicle 100 continues to follow the actual travelling plan including the planned travelling path, the planned speed, the planned acceleration/deceleration, etc. Further, the own vehicle's behaviour could be changed if it would be determined that the detected object continues its travelling on a "meeting course". In order to avoid a meeting, the travelling plan of the own vehicle 100 could be altered by the apparatus 1, e.g. by the vehicle control 10 or a dedicated travelling plan unit 9, such as to stop the own vehicle 100 at the entry of the roundabout or to reduce the speed of the own vehicle 100 or the like. The travelling plan unit 9 may for example be located on a remote computer which provides travel plan data to the apparatus 1. Otherwise, the travelling plan unit 9 may also be included in the apparatus 1 or in the own vehicle 100. The travelling plan unit 9 generally can have the technical function of creating travelling plans for the automated or assisted driving.

Figure 6C:
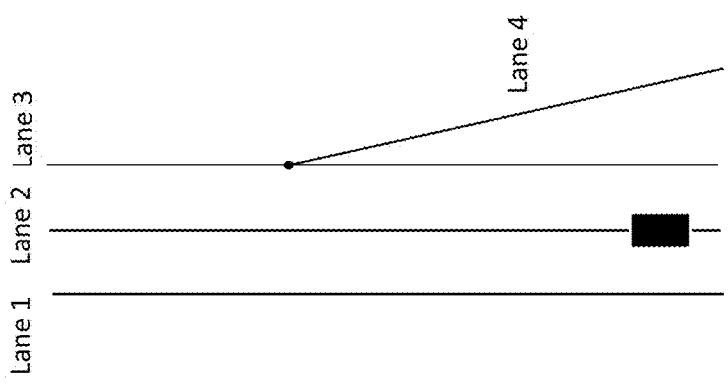
FIGS. 6a-c show further examples of an application scenario of the travelling control apparatus 1.
Figure 6B:
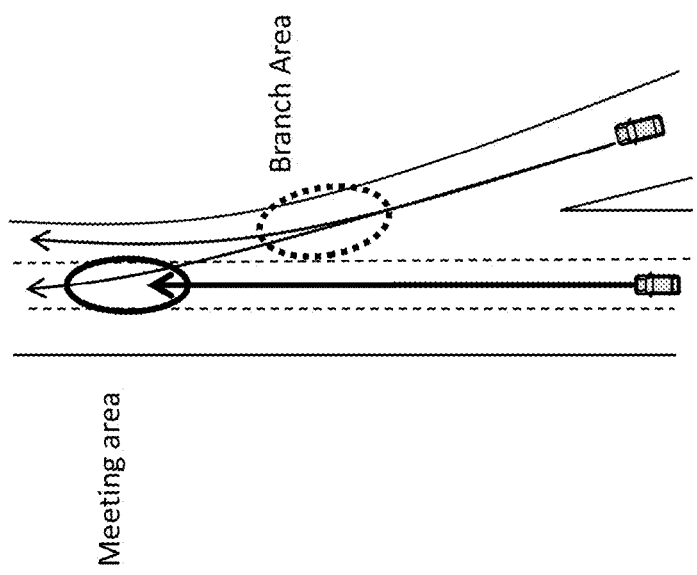
Figure 6A:
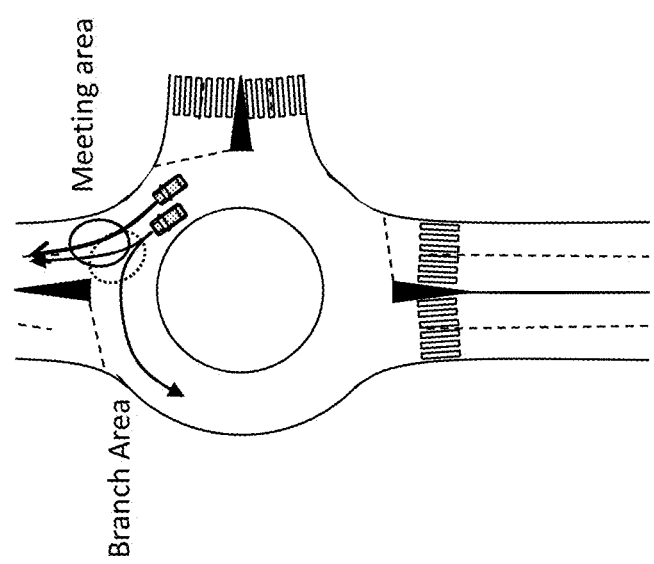

FIG. 6a shows another use case in which the own vehicle 100 is approaching an exit of a roundabout. The travelling plan of the own vehicle 100 includes a travelling path which leads out of the roundabout which has two lanes within the circle area thereof. However, a detected object/another vehicle travels on the inner lane of the roundabout on the left front side of the own vehicle 100. If the other vehicle will continue to go along the circle area on the inner lane, there will be no meeting and the own vehicle 100 does not have to change its behaviour/travelling plan. But if the other vehicle would also want to leave the roundabout, a collision may happen. The collision may happen at the merging of the two lanes of the roundabout if the exit road of the roundabout only has a single lane. Since, in this very example, the exit of the roundabout has only a single lane, the node of the exit is also the node of the branching area as defined above. This means that in this example the branching area and the meeting area would be identical or at least very strongly overlapping. As a consequence, the apparatus 1 or a sub-unit thereof may adjust the setting of the two areas by shifting at least one of the two areas away from the node of the exit. E.g., the shifting may include that the branching area is moved/shifted closer to the actual position of the detected object so that only a partial overlapping or no overlapping is present. Further, the area size of at least one of the two areas may be reduced. When only a partial overlap or no overlap is present, the above procedure can take place (substantially) without further changes.

FIGS. 6b,c (middle and right hand side of FIG. 6) show another use case when the own vehicle 100 is travelling on the highway with three lanes and an on-coming vehicle is entering the highway from an approach lane. The approach lane merges with the lane 3 at a position ahead of the actual position of the detected object and the own vehicle 100. As shown in the FIGS. 6b and c, the meeting area and the branching area can be set in correspondence to the example explained in connection with FIG. 3. This scenario further shows that the map information used may also require not only road level information but also lane level information so as to define nodes at intersecting lanes. Further, the areas in this example are set rather elliptic than circular (as in the roundabout example of FIG. 3) because the areas may also be set, in another option, in accordance with the speed of the vehicles, which may include that a rather elongated elliptic shape is applied when the speed is above a predefined value and a rather circular shape is used when the speed is rather low/below the predefined value.

The above examples for the application of the apparatus 1 and its underlying control method shall not be limited to the depicted use cases. Further use cases may exist and the claimed subject matter shall be considered applicable thereto. Even further, the above examples or single features thereof may be combined with each other to form additional examples/embodiments as long as the combination is achievable by the person skilled in the art without applying inventive activity.

Summarizing, the described subject matter allows to reduce computational burden and it increases the safety and comfort of automated or computer-assisted driving because it can help the apparatus 1 to take decisions which are imitating the behavior of a human driver who would judge whether he/she needs to adapt the driving behavior when he/she detects another object in the future driving course.

The invention claimed is:

1. A vehicle travelling control apparatus configured to be installed on an own vehicle, the vehicle travelling control apparatus comprising one or more memory devices storing instructions thereon, that, when executed by one or more processors, cause the one or more processors to:
   determine, based on a signal received from a vehicle location device, the actual position of the own vehicle;
   receive map information;
   receive information from a vehicle surroundings sensor and detect an object in the surroundings of the own vehicle based on said information received from the vehicle surroundings sensor;
   determine whether a detected object and the own vehicle could meet within a meeting area at an intersection ahead of the own vehicle;
   predict a future behavior of the detected object when the instructions caused the one or more processors to estimate that a collision could happen in said meeting area; and
   alter a travelling plan of the own vehicle based on the predicted future behavior of the detected object;
   control an operation of the own vehicle associated with the altered travelling plan in response to a determination that the detected object and the own vehicle could meet within the meeting area,
   wherein the instructions cause the one or more processors to set said meeting area and set a branching area ahead of the meeting area in the travelling direction of the detected object, the branching area being an area defined by the map information and the information received from the vehicle surroundings sensor in which the detected object can change its travelling path before entering the meeting area; and
   the instructions cause the one or more processors to apply a normal prediction mode when the detected object is outside said branching area and a detailed prediction mode when the detected object is within said branching area.

2. The vehicle travelling control apparatus according to claim 1, wherein, in the normal prediction mode, the instructions cause the one or more processors to use a predetermined number of features of the detected object for predicting the future behavior of the detected object, and, in the detailed prediction mode, to use more features of the detected object than in the normal prediction mode for predicting the future behavior of the detected object.

3. The vehicle travelling control apparatus according to claim 1, wherein the predicting of the future behavior includes predicting which of a possible future travelling paths the detected object may take.

4. The vehicle travelling control apparatus according to claim 1, wherein, in the normal prediction mode, the future behavior of the detected object is predicted based on at least one the features including speed of the detected object, direction of movement of the detected object, shape of the detected object.

5. The vehicle travelling control apparatus according to claim 1, wherein, in the detailed prediction mode, the future behavior of the detected object is predicted based on at least one of the additional feature including a blinker, a change of the shape of the tire(s) between two time frames and/or a tire position of the detected object.

6. The vehicle travelling control apparatus according to claim 1, wherein the map information is received from a map information unit and the map information received includes at least links representing lanes and/or streets and nodes representing intersections of lanes and/or streets.

7. The vehicle travelling control apparatus according to claim 6, wherein the meeting area is set at a node which is located in an area where the detected object and the own vehicle could meet and the branching area is set at a node before the node of the meeting area in the driving direction of the detected object.

8. The vehicle travelling control apparatus according to claim 7, wherein the branching area is set at a node immediately before the node of the meeting area in the driving direction of the detected object.

9. The vehicle travelling control apparatus according to claim 7, wherein a diameter of the merging and/or branching area is set based on the parameters of the street or based on a predefined value or a value defined in a database.

10. The vehicle travelling control apparatus according to claim 1, wherein an intersection of streets or lanes include roundabouts and approach lanes of a motorway.

11. An own vehicle including a vehicle travelling control apparatus according to claim 1 and a vehicle surroundings sensor, which is one of or a combination of a lidar sensor, a camera, a stereo-camera sensor, a radar sensor, or an electro magnetic wave sensor.

12. A method for controlling an own vehicle comprising the steps of:

receiving map information and localizing an actual position of the own vehicle based on a signal received from a vehicle location device;

detecting an object in the surroundings of the own vehicle based on received data from a vehicle surroundings sensor of the own vehicle, determining whether a detected object and the own vehicle could meet in a meeting area at an intersection towards which the own vehicle travels;

predicting a future behavior of the detected object when it was estimated that a meeting could happen in said meeting area; and deciding about an adaption of a travelling plan of the own vehicle based on the predicted future behavior of the detected object, wherein a normal prediction mode is applied when the detected object is outside a branching area and a detailed prediction mode is applied for the predicting of the future behavior of the detected object when the detected object is within a branching area, the branching area defined, based on the map information and the data received from the vehicle surroundings sensor, to be an area that is placed before the meeting area in the travelling direction of the detected object and in which the detected object can change its travelling path before entering the meeting area.

13. A computer program product storable in a non-transitory memory comprising instructions which, when carried out by a computer, cause the computer to perform the method according to claim 12.

* * * * *